(12) United States Patent
Yamada et al.

(10) Patent No.: US 11,509,777 B2
(45) Date of Patent: Nov. 22, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Takayuki Yamada, Kanagawa (JP); Jumpei Takeichi, Kanagawa (JP); Hiroyasu Kunieda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/191,540

(22) Filed: Mar. 3, 2021

(65) Prior Publication Data
US 2021/0289081 A1   Sep. 16, 2021

(30) Foreign Application Priority Data
Mar. 13, 2020   (JP) .............................. JP2020-044449

(51) Int. Cl.
*H04N 1/00*   (2006.01)

(52) U.S. Cl.
CPC ..... *H04N 1/00196* (2013.01); *H04N 1/00161* (2013.01); *H04N 1/00456* (2013.01)

(58) Field of Classification Search
None
See application file for complete search history.

(56) References Cited

U.S. PATENT DOCUMENTS

| | | | |
|---|---|---|---|
| 2005/0128518 A1* | 6/2005 | Tsue | G06T 11/60 358/1.15 |
| 2006/0210166 A1* | 9/2006 | Takemoto | G06V 20/40 382/190 |
| 2010/0289818 A1* | 11/2010 | Hirooka | G06F 40/103 345/619 |
| 2016/0358318 A1* | 12/2016 | Zhang | G06K 9/00288 |
| 2018/0146105 A1* | 5/2018 | Saito | H04N 1/00196 |
| 2019/0379795 A1* | 12/2019 | Yamaji | H04N 1/00148 |
| 2021/0203791 A1* | 7/2021 | Noguchi | G06T 11/60 |
| 2021/0406588 A1* | 12/2021 | Noguchi | G06K 9/623 |

FOREIGN PATENT DOCUMENTS

| | | | | |
|---|---|---|---|---|
| JP | 2007143093 | * | 6/2007 | G06T 11/60 |
| JP | 2007194966 | * | 8/2007 | G06T 11/80 |
| JP | 2012221005 | * | 11/2012 | G06T 11/60 |
| JP | 2019215593 A | | 12/2019 | |
| KR | 20070008195 | * | 1/2007 | H04M 1/23 |

OTHER PUBLICATIONS

John C. Platt, "AutoAlbum: Clustering Digital Photographs using Probabilistic Model Merging", Jan. 1, 2000, 2000 Proceedings Workshop on Content-based Access of Image and Video Libraries (pp. 96-100) (Year: 2000).*

* cited by examiner

*Primary Examiner* — Beniyam Menberu
(74) *Attorney, Agent, or Firm* — Canon U.S.A., Inc. IP Division

(57) ABSTRACT

An image processing apparatus displays, based on a layout result for model album data and a layout result for similar album data, a region having a difference satisfying a predetermined condition in the layout result for the similar album data, in a highlighted manner more than other regions.

17 Claims, 12 Drawing Sheets

FIG.3A

| NUMBER OF PAGES | SIZE (W) | SIZE (H) | PAPER TYPE | BINDING PORTION |
|---|---|---|---|---|
| 20 | 150 | 150 | COATED PAPER | PERFECT BINDING |

FIG.3B

| SPREAD NUMBER | x | y | w | h | angle | image path |
|---|---|---|---|---|---|---|
| 0 | 150 | 0 | 150 | 150 | 0 | image1.jpg |
| 1 | 10 | 10 | 130 | 130 | 0 | image12.jpg |
| 1 | 160 | 10 | 130 | 130 | 0 | image15.jpg |
| 2 | 10 | 10 | 130 | 60 | 0 | image19.jpg |
| 2 | 10 | 80 | 130 | 60 | 0 | image20.jpg |
| 2 | 175 | 10 | 100 | 130 | 0 | image22.jpg |
| ⋮ | | | | | | |
| 10 | 0 | 0 | 300 | 150 | | image103.jpg |
| 10 | 20 | 60 | 60 | 80 | 10 | image5.jpg |

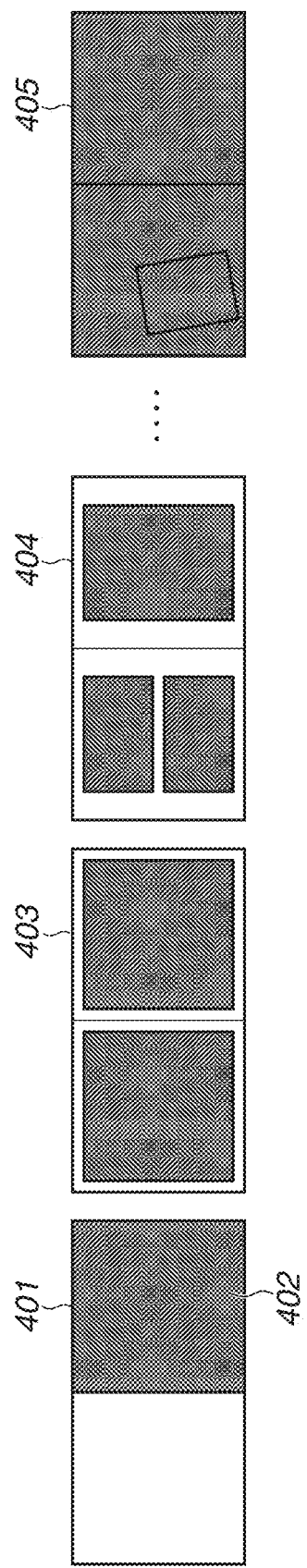

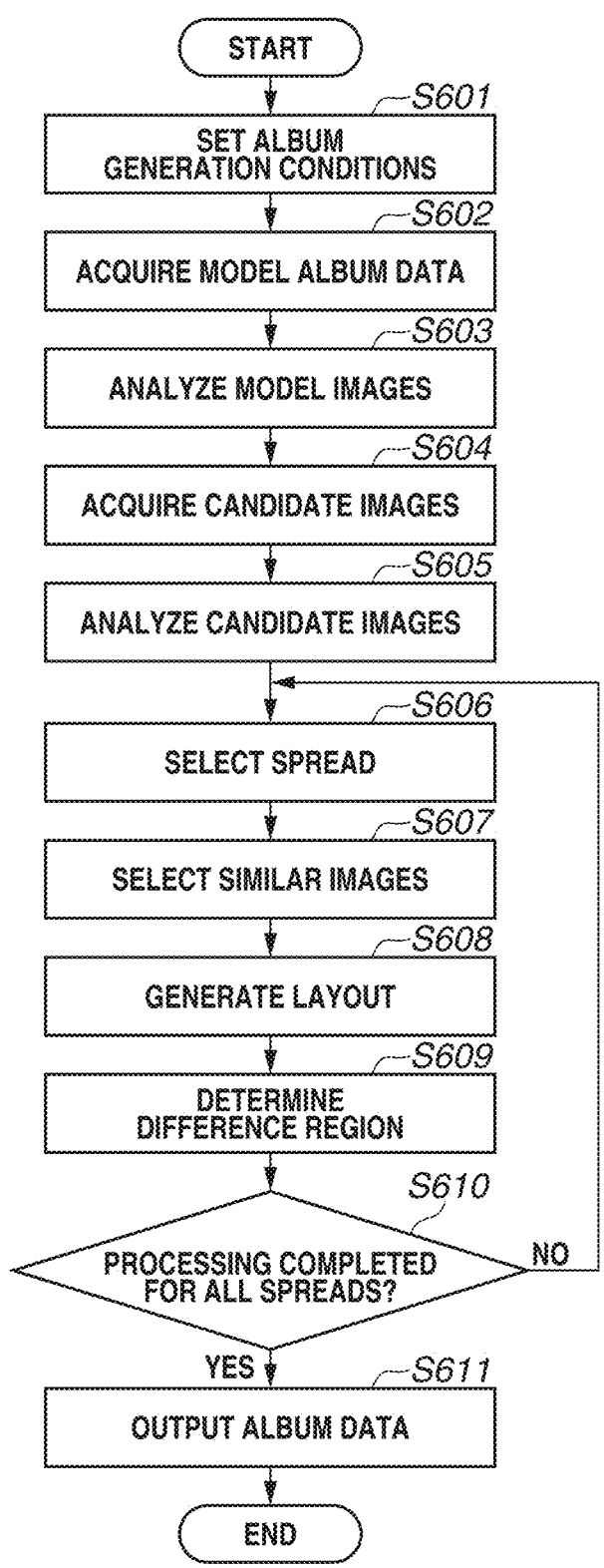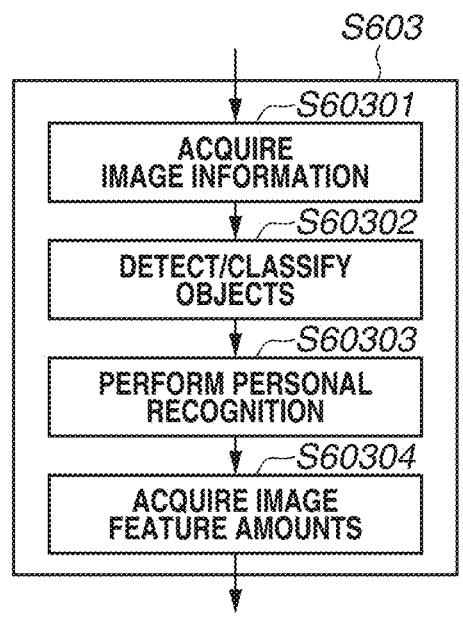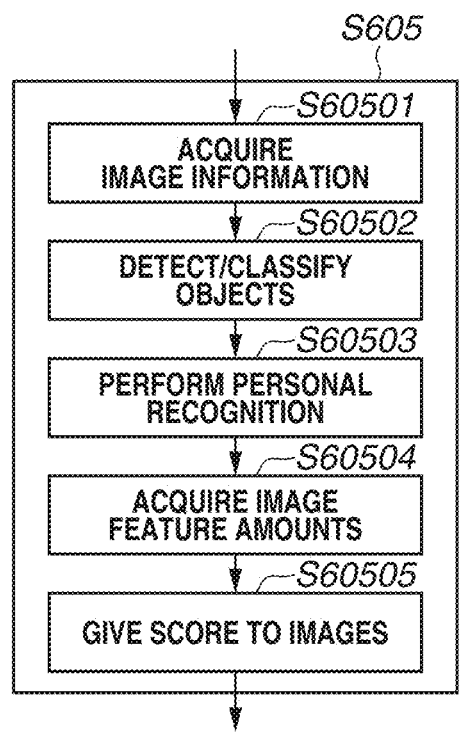

FIG.11

| SCENE | IMAGE CAPTURING PERIOD (HOURS) | | NUMBER OF CAPTURED IMAGES | | NUMBER OF IMAGE-CAPTURED PERSONS | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

IMAGE PROCESSING APPARATUS, IMAGE PROCESSING METHOD, AND STORAGE MEDIUM

BACKGROUND

Field

The present disclosure relates to an image processing apparatus, a control method, and a storage medium.

Description of the Related Art

Japanese Patent Application Laid-Open No. 2019-215593 discusses a technique for generating an album by using information about an input image group.

There has been a demand for a technique for easily generating a print product desired by the user.

SUMMARY

According to an aspect of the present disclosure, an image processing apparatus, includes a first acquisition unit configured to analyze a model image included in model album data to acquire a first analysis result, a second acquisition unit configured to analyze a plurality of candidate images to acquire a second analysis result, a selection unit configured to select an image similar to the model image from among the plurality of candidate images, as a similar image, based on the first and the second analysis results, a generation unit configured to generate similar album data based on data of the selected similar image, and a display control unit configured to, based on a layout result for the model album data and a layout result for the similar album data, display a region having a difference satisfying a predetermined condition in the layout result for the similar album data, in a highlighted manner more than other regions.

Further features of the present disclosure will become apparent from the following description of exemplary embodiments with reference to the attached drawings.

BRIEF DESCRIPTION OF THE DRAWINGS

FIGS. 3A and 3B are tables illustrating a structure of album data.

FIG. 4 illustrates an album layout.

FIGS. 6A, 6B, and 6C are flowcharts illustrating automatic layout processing.

FIG. 11 is a table illustrating a scene classification method.

DESCRIPTION OF THE EMBODIMENTS

According to a first exemplary embodiment, an image processing apparatus operates an album generation application to generate album data in which a plurality of captured images is automatically laid out on the application. Then, the image processing apparatus transmits this album data to a printing apparatus to generate an album as a print product. The present exemplary embodiment generates similar album data that is similar to model album data (example album data) based on the model album data. More specifically, the similar album data has the same number of pages as the model album data. Further, similar images that are similar to the model images arranged on each page of the model album data are arranged in the similar album data. The positions at which model images are arranged in the model album data are the same as the positions at which the similar images are arranged in the similar album data. For example, when a model image is arranged at the top left on the third page of the model album data, a similar image is also arranged at the top left on the third page of the similar image data. The image group used to generate the model album data is different from the image group used to generate the similar album data.

<Hardware Configuration of Image Processing Apparatus>

The hardware configuration of the image processing apparatus according to the present exemplary embodiment will be described with reference to FIG. 1. A case where the image processing apparatus is an information processing apparatus, such as a personal computer (PC), will be described. However, other apparatuses such as a smart phone may be used as an example of an image processing apparatus.

Figure 1:
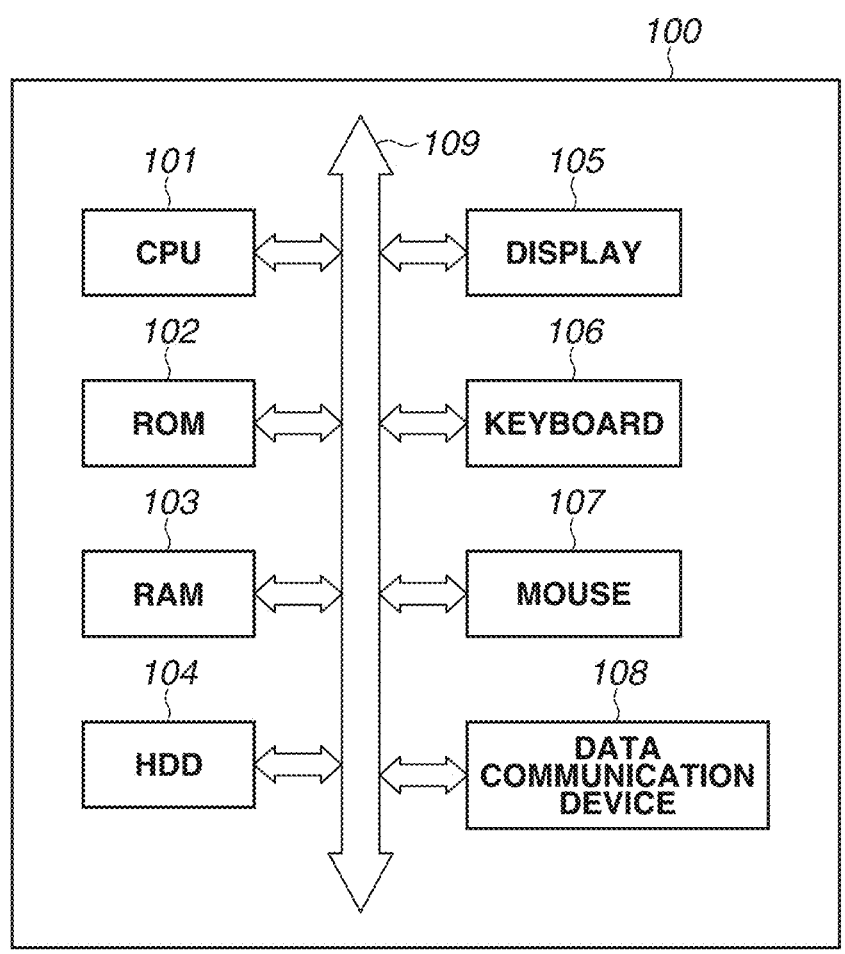
FIG. 1 is a block diagram illustrating a hardware configuration of an image processing apparatus.

As illustrated in FIG. 1, an image processing apparatus 100 includes a central processing unit (CPU) 101, a read only memory (ROM) 102, a random access memory (RAM) 103, a hard disk drive (HDD) 104, a display 105, a keyboard 106, a mouse 107, and a data communication device 108. These units are connected via a data bus 109 and are capable of mutually transmitting and receiving data.

The CPU 101 controls the entire image processing apparatus 100. The CPU 101 executes an image processing method according to the present exemplary embodiment based on a program. Although, in FIG. 1, the image processing apparatus 100 includes one CPU, the image processing apparatus 100 may include a plurality of CPUs.

The ROM 102 stores the program to be executed by the CPU 101. The RAM 103 offers a memory area for temporarily storing various information when the CPU 101 executes the program. The HDD 104 stores a database for storing image files and results of processing such as image analysis. According to the present exemplary embodiment, the HDD 104 stores an album generation application program. This applications program may also be called an album generation application and will be described below with reference to FIG. 5.

The display 105 is a device for presenting to the user a user interface (hereinafter referred to as a UI) and the image layout result according to the present exemplary embodiment. The display 105 may have a touch sensor function. The keyboard 106 is an input device of the image processing apparatus 100 and is used, for example, to input predetermined information to a GUI displayed on the display 105. According to the present exemplary embodiment, the user inputs the number of double-page spreads of the album via the keyboard 106. The mouse 107 is an input apparatus of the image processing apparatus 100 and is used, for example, to click a button on a GUI displayed on the display 105.

The data communication device 108 communicates with an external apparatus, such as a printer and a server. For example, the album data as a result of automatic layout is transmitted to a printer and a server connected to the image processing apparatus 100 via the data communication device 108. The album data transmitted to the server is printed by a printer connected to the server. The data bus 109 connects the above-described components and the CPU 101. This completes the description of the hardware configuration of the image processing apparatus 100 according to the present exemplary embodiment.

<Software Configuration of Image Processing Apparatus>

The software configuration of the image processing apparatus 100 according to the present exemplary embodiment, in other words, the function configuration implemented by the album generation application installed in the image processing apparatus 100, will be described with reference to FIG. 2. The album generation application is activated when the user double-clicks the icon of the application displayed on the display 105 by using the mouse 107. Of various functions of the album generation application, an automatic layout function offered by an automatic layout processing unit 201, which is a particularly important function of the present exemplary embodiment, will be mainly described.

Figure 2:
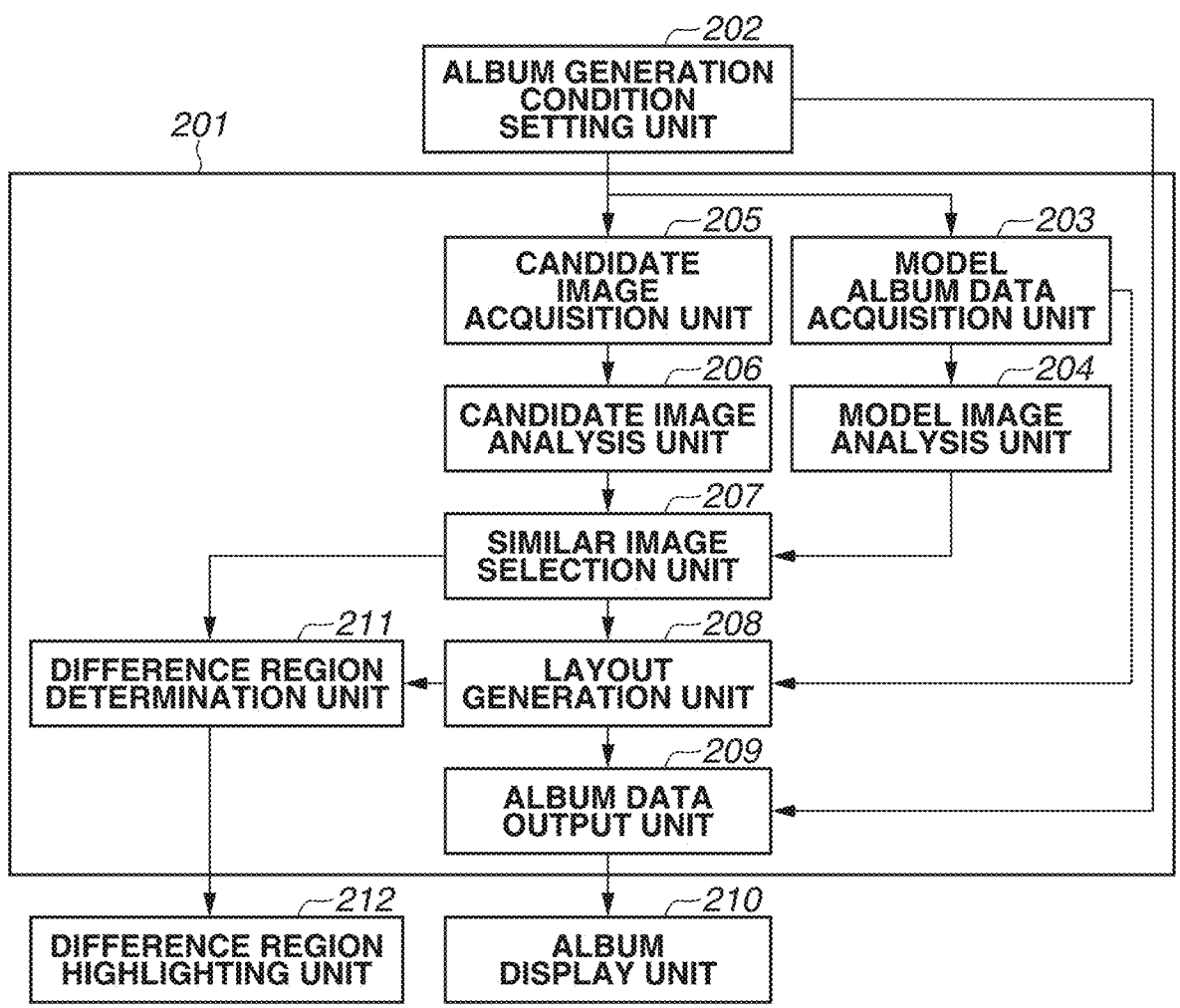
FIG. 2 is a block diagram illustrating a software configuration of the image processing apparatus.

As illustrated in FIG. 2, the album generation application includes an album generation condition setting unit 202, an automatic layout processing unit 201, and an album display unit 210. The "automatic layout function" is a function of selecting images suitable for the generation of album data based on the content and attribute of each image from the image group of captured photographs, and laying out the images to generate album data. The generated album data is displayed on the display 105.

The album generation condition setting unit 202 sets album generation conditions corresponding to the user's mouse operation to the automatic layout processing unit 201. According to the present exemplary embodiment, the album generation condition setting unit 202 sets the model album data, an image group to be used for the album, and album commercial materials as album generation conditions. The model album data may be set, for example, by specifying a file or directory. When the album data is stored in a file configuration specific to the album generation application, the album generation conditions may be set based on the file configuration. The album generation conditions may be set by the user selecting a condition from among preset options registered in the application. The image group may be set, for example, by using accompanying information and attribute information for individual image data including the image capturing date and time. Also, when the album data is stored in a file configuration specific to the album generation application, the image group may also be set based on the file configuration. The album commercial material refers to the type of paper to be used for the album and processing of a binding portion at the time of bookbinding.

An album to be generated according to the present exemplary embodiment will be described. The album to be generated according to the present exemplary embodiment includes a cover and a plurality of double-page spreads. In display, a "double-page spread" is equivalent to a single display window. In printing, a "double-page spread" is equivalent to a pair of adjacent pages printed on different sheets. Alternatively, an album may be formed by printing an image on a sheet and folding the sheet at the center. In this case, a "double-page spread" is equivalent to a pair of adjacent pages printed on the same sheet. The following description will be made by using such a concept of a double-page spread, but it may be a page. According to the present exemplary embodiment, the similar album data that is similar to the model album data is generated based on the model album data set by the album generation condition setting unit 202 and a candidate image group.

The album data according to the present exemplary embodiment includes images to be arranged in the album, and information including spread numbers in which the images are to be arranged, and positions and sizes of the images. FIGS. 3A and 3B illustrate an example of album data according to the present exemplary embodiment. FIG. 3A illustrates an example of a commercial material table representing information about the entire album. The commercial material table records the number of pages and the size of the album, the type of printing paper, and the bookbinding method. FIG. 3B illustrates an example of a slot table representing the images to be arranged on the page space and the positions of the images. Each row of the slot table records an image to be arranged in the album, the spread number in which the image is to be arranged, the position at which the image is to be arranged in the double-page spread, and the size and angle of the image. In the table illustrated in FIG. 3B, information for each row is referred to as slot information, and slot groups belonging to the same spread number in the model album data are collectively referred to as a template. However, information included in the album data is not limited thereto. Layer information representing the display order of overlapped images, the amount of trimming, the effect type, the character information, and the graphic information may also be included in the slot information.

FIG. 4 illustrates an example of a layout for the album data illustrated in FIGS. 3A and 3B. A cover 401, a double-page spread 403, a double-page spread 404, and a double-page spread 405 correspond to spread numbers 0 1, 2, and 10, respectively, illustrated in FIG. 3B. The cover 401 includes the left side for the back cover and the right side for the front cover. The shaded areas illustrated in FIG. 4 represent slots, where image data recorded in "image path" illustrated in FIG. 3B is to be arranged. For example, "image1.jpg" is to be arranged in a slot 402. Automatic layout processing described below generates similar album data in which images having similar composition, object, tint, and other image features to images arranged in the model album data are arranged at similar positions to the model album data.

A model album data acquisition unit 203 acquires the model album data based on the settings made by the album generation condition setting unit 202 from among the album data stored in the HDD 104.

A model image analysis unit 204 analyzes model image groups to be used for the model album data acquired by the model album data acquisition unit 203. According to the present exemplary embodiment, the model image analysis unit 204 derives image feature amounts and performs object determination, composition determination, and face detection in images, and facial expression recognition and personal recognition on the detected faces. The model image analysis unit 204 further refers to data (e.g., Exif information) accompanying the image data acquired from the HDD 104 to acquire image capturing date and time information. Information acquired as a result of analyzing the model images by the model image analysis unit 204 is referred to as "analysis information". The analysis information is managed in association with each model image. For example, the analysis information may be managed as part of the slot information illustrated in FIG. 3B.

A candidate image acquisition unit 205 acquires an image group that satisfies the album generation conditions set by the album generation condition setting unit 202 from among the images stored in the HDD 104. The image group in this case refers to an image group to be considered as a layout candidate at the time of album generation. According to the present exemplary embodiment, the image group refers to an image group to be considered as a layout candidate for the similar album data. For example, when Jan. 1, 20XX is specified as the image capturing date/time, all of images captured on Jan. 1, 20XX correspond to the image group as a layout candidate. Images stored in the HDD 104 include still images and clip images clipped from moving images. Still images and clip images are images acquired from imaging devices such as digital cameras and smart devices. The image processing apparatus 100 may include an imaging device, or an external apparatus of the image processing apparatus 100 may include an imaging device. When imaging device is an external apparatus, the candidate image acquisition unit 205 acquires images via the data communication device 108. Still images and clip images may be images acquired from an external network or server via the data communication device 108. Images acquired from a network or server include social networking service images (hereinafter, referred to SNS images). The CPU 101 executes a program of the operating system (OS) to analyze data accompanying the image data for each image to acquire the storage destination as image acquisition destination. However, the CPU 101 may manage the image acquisition destination in the application by acquiring images from an SNS via the application. Images to be acquired by the candidate image acquisition unit 205 are not limited to the above-described images but may be images of other types. According to the present exemplary embodiment, an image group to be considered as a layout candidate for the similar album data is referred to as a candidate image group.

A candidate image analysis unit 206 analyzes the candidate image data acquired by the candidate image acquisition unit 205. The processing of the candidate image analysis unit 206 is similar to the processing of the model image analysis unit 204, and the detailed description thereof will be omitted. The candidate image acquisition unit 205 further gives a score indicating whether each image is suitable for the album to each candidate image included in the candidate image group. A higher score is given to image data of an image having higher sensuousness such as higher contrast and sharper edges, an image of a person not blinking, and an image including a larger subject such as a person and building. In this case, the analysis information obtained through the processing of the candidate image analysis unit 206 and the score given by the candidate image acquisition unit 205 are managed in association with each candidate image.

A similar image selection unit 207 selects similar images to be used for the similar album data from the candidate image group based on the analysis information for the model images analyzed by the model image analysis unit 204 and the analysis information for the candidate images analyzed by the candidate image analysis unit 206. In other words, the similar image selection unit 207 selects a similar image from the candidate image group for each individual model image. A similar image refers to an image having a high similarity to a model image in the candidate image group. Examples of similarities include the distance between the image feature amount analyzed by the model image analysis unit 204 and the image feature amount analyzed by the candidate image analysis unit 206. Two images having a shorter distance can be said to have a higher similarity. The similar image selection unit 207 may use the result of the personal recognition analyzed by the candidate image analysis unit 206 when a similar image is selected, and may use the score given to the candidate image data. Although, the distance between the image feature amounts is used as a similarity, it is not limited thereto. For example, the cosine similarity representing the angle between feature amount vectors is also applicable. The similar image selection unit 207 transmits the selected similar image to a layout generation unit 208, and transmits the obtained similarity to a difference region determination unit 211.

Figure 7A:
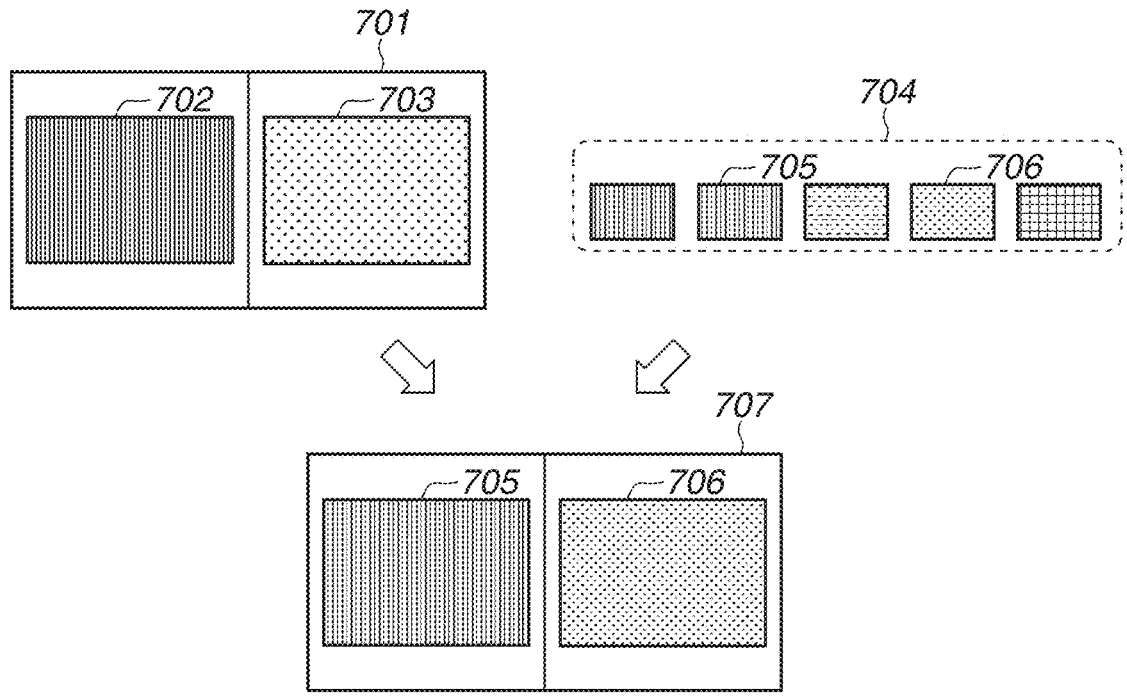
FIGS. 7A and 7B illustrate examples of layout results.
Figure 7B:
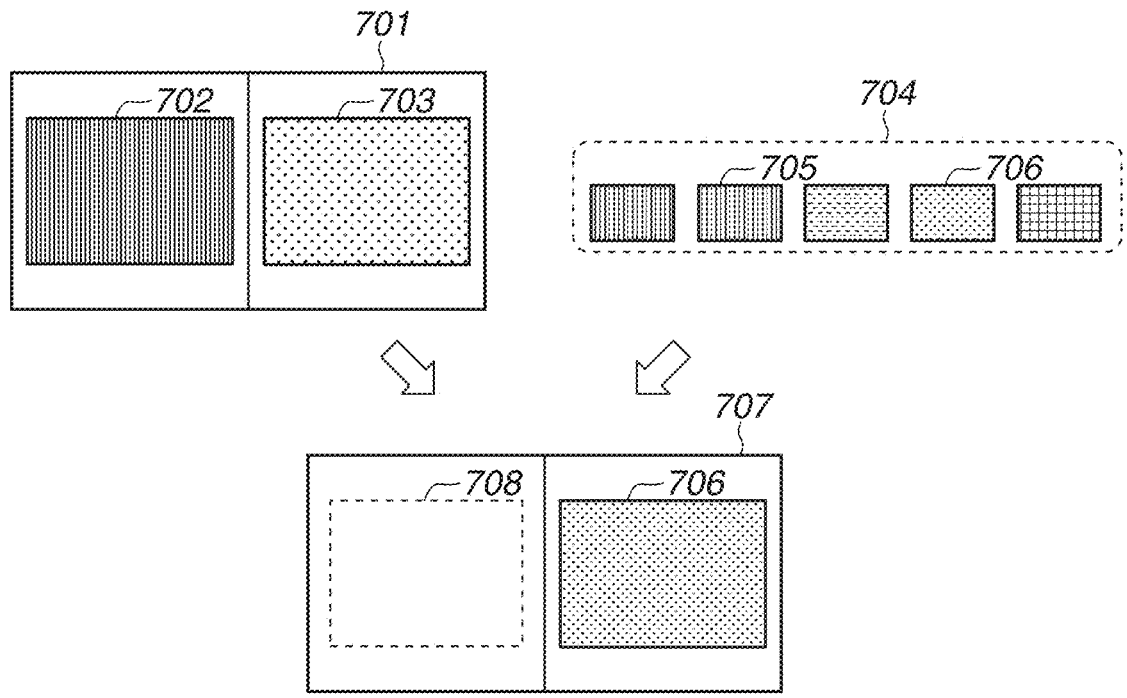

The layout generation unit 208 assigns the similar image selected by the similar image selection unit 207 to the model template of the model album data acquired by the model album data acquisition unit 203. Data including a model template and a similar image assigned thereto is referred to as layout data. A model template is a template to which a model image has been assigned. More specifically, the layout generation unit 208 generates layout data by arranging the similar image corresponding to the model image assigned to each slot of the model template. A method for generating layout data according to the present exemplary embodiment will be described below with reference to FIGS. 7A and 7B. FIGS. 7A and 7B illustrate a model template 701 and layout data 707 generated by the layout generation unit 208. First, the layout generation unit 208 acquires the model template 701 that includes model images 702 and 703 arranged therein. A candidate image group 704 represents an image group acquired by the candidate image acquisition unit 205. A similar image 705 in the candidate image group 704, determined to be similar to the model image 702, is arranged instead of the model image 702 of the model template 701. Further, a similar image 706 in the candidate image group 704, determined to be similar to the model image 703, is arranged instead of the model image 703 of the model template 701. As a result, the layout data 707 is generated.

An album data output unit 209 generates album data based on the layout data including all of double-page spreads generated by the layout generation unit 208, and then outputs the album data. According to the present exemplary embodiment, the output refers to display processing based on the album data. However, output may refer to, for example, print processing based on the album data.

The album display unit 210 generates album images based on the album data output by the album data output unit 209 and displays the album images on the display 105. An album image is, for example, image data having the bitmap format based on the layout data, and may be referred to as a double-page spread image. The difference region determination unit 211 determines a difference region having a difference from the model template, in the layout data generated by the layout generation unit 208. According to the present exemplary embodiment, the difference region determination unit 211 uses the similarity between the model image calculated by the similar image selection unit 207 and the candidate image, to determine a difference region. Referring to FIG. 7A, the difference region determination unit 211 determines whether the similarity between the model image 702 and the similar image 705 determined to be similar to the model image 702 is larger than or equal to a threshold value. When the difference region determination unit 211 determines that the similarity is less than the threshold value, the slot in which the model image 702 of the model template is arranged is determined to be a difference region. According to the present exemplary embodiment, a value preset through subjective evaluation is built in the application as the threshold value. For example, when the cosine similarity is used as the similarity, the similarity closer to 0 means that two images are not similar to each other, and the similarity closer to 1 means that two images are similar to each other. Subjecting a plurality of pairs of images to subjective evaluation in advance enables determining, for example, that there is a difference when the cosine similarity is 0.8 or less, or that there is no difference when the cosine similarity is larger than 0.8. Alternatively, the user may adjust the threshold value through a GUI of the application. For another example, the threshold value may be determined by the deviance from the average similarity. For example, the difference region determination unit 211 calculates the second and the third quantiles based on the similarity between all of the similar images selected by the layout generation unit 208. Subsequently, the difference region determination unit 211 determines the threshold value according to Formula (1):

$$\text{Threshold value} = \text{Second quantile} + (\text{Third quantile} - \text{Second quantile}) \times 1.5 \quad (1)$$

In this way, the difference region determination unit 211 can determine an image having a low similarity depending on the similarity distribution.

A difference region highlighting unit 212 displays the difference region determined to have a difference by the difference region determination unit 211 in a more highlighted way than other regions, on the GUI displayed on the display 105. The GUI to be displayed will be described below with reference to FIGS. 8A and 8B.

When the program of the album generation application according to the present exemplary embodiment has been installed in the image processing apparatus 100, the starting icon of this application is displayed on the starting screen (desktop) of the OS operating on the image processing apparatus 100. When the user double-clicks the starting icon on the desktop displayed on the display 105 with the mouse 107, the program of the album generation application stored in the HDD 104 is loaded into the RAM 103. Then, the program loaded into the RAM 103 is executed by the CPU 101, and the album generation application is activated. This completes the description of the software configuration of the image processing apparatus 100 according to the present exemplary embodiment. The application may be in other forms, for example, a web application that displays a screen in a browser operating on the image processing apparatus 100.

<GUI Screens>

Figure 5:
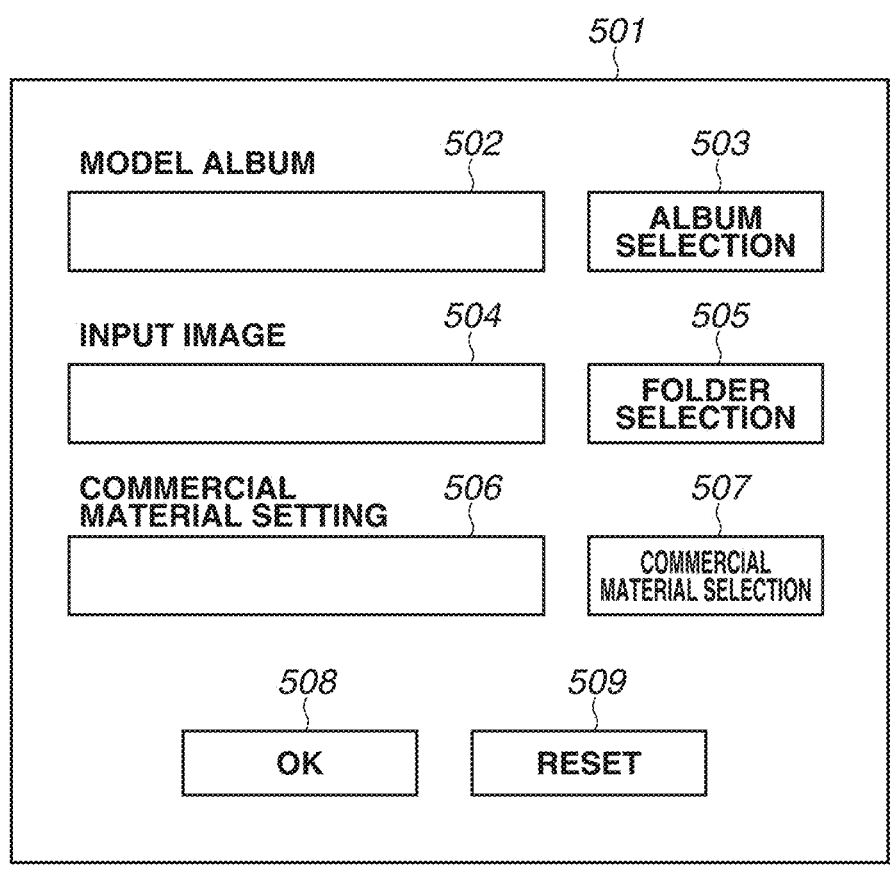
FIG. 5 illustrates a graphical user interface (GUI) of an album generation application.

GUI screens of the album generation application according to the present exemplary embodiment will be described below with reference to FIGS. 5, 8A, and 8B. FIG. 5 illustrates a GUI screen 501 offered by the activated album generation application and displayed on the display 105. The user can set the album generation conditions via the GUI screen 501.

The GUI screen 501 includes a path box 502 and a selection button 503 as a model album data setting portion. The path box 502 is a box for indicating the storage location (path) of the model album data stored in the HDD 104. The selection button 503 is a button used to select the model album data. When the user clicks the selection button 503 with the mouse 107, a tree including a plurality of folders and files is displayed. When the user selects a file storing the model album data, the file path of the selected file is displayed in the path box 502.

A path box 504 and a selection button 505 are used to select a photographic image to be arranged in the album. The path box 504 is a box for indicating the storage location (path) of the image group to be the album generation target. The selection button 505 is a button used to select the folder including the image group to be the album generation target. When the user clicks the selection button 505 with the mouse 107, a tree including a plurality of folders is displayed. When the user selects the folder including the image group to be the album generation target, the folder path of the selected folder is displayed in the path box 504. Thus, according to the present exemplary embodiment, a candidate image group is selected by using the path boxes 504 and 505 illustrated in FIG. 5.

A commercial material setting box 506 and a commercial material selection button 507 receives settings related to the commercial materials of the album to be generated. The commercial material setting box 506 is a box for indicating commercial material information for the album to be generated. More specifically, the commercial material setting box 506 displays the commercial material information for the model album data selected by the selection button 503. The commercial material selection button 507 is a button used to change the commercial material. When the user clicks the commercial material selection button 507 with the mouse 107, a list of commercial materials is displayed. When the user selects a commercial material, information about the selected commercial material is displayed in the commercial material setting box 506.

An OK button 508 is a button used to determine the selected conditions as the album generation conditions. When the user clicks the OK button 508 with the mouse 107, the album generation conditions are determined. Then, the album generation conditions are transmitted to the automatic layout processing unit 201 via the album generation condition setting unit 202. More specifically, the path information input in the model album path box 502 is transmitted to the model album data acquisition unit 203. Also, the path information input in the path box 504 is transmitted to the candidate image acquisition unit 205. The commercial material information input in the commercial material setting box 506 is transmitted to the album data output unit 209.

A reset button 509 is a button used to reset each setting on the display screen. This completes the description of a GUI screen of the album generation application according to the present exemplary embodiment.

Figure 8A:
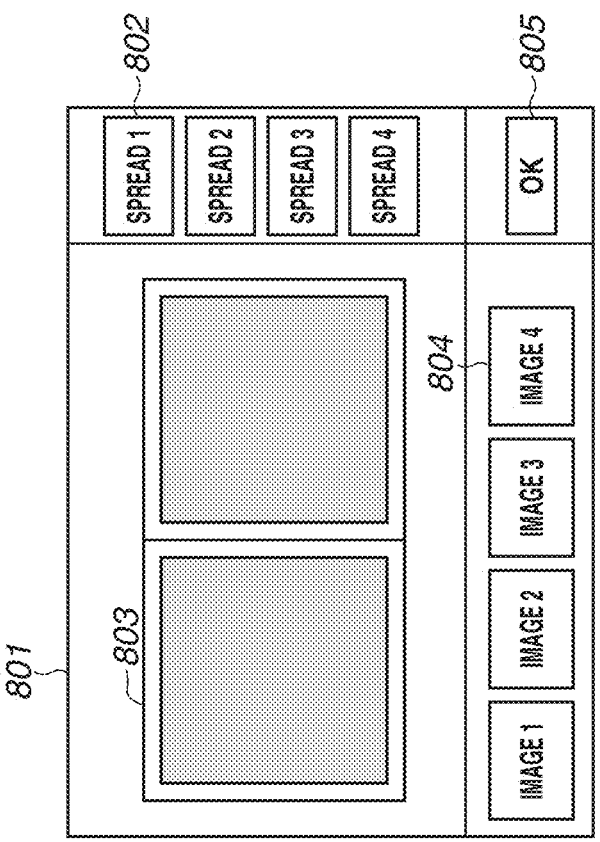
FIGS. 8A and 8B illustrate another GUI of the album generation application.
Figure 8B:
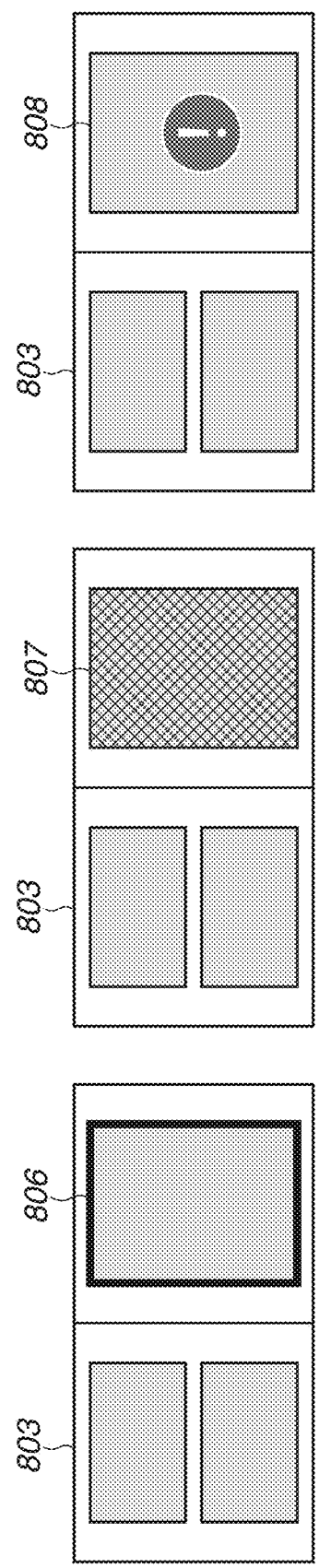

FIGS. 8A and 8B illustrate a GUI offered by the activated album generation application and displayed on the display 105. FIG. 8A illustrates a GUI screen 801 displayed by the album display unit 210. The GUI screen 801 enables the user to check and edit the album data output by the album data output unit 209.

The GUI screen 801 includes a double-page spread list 802, a double-page spread display area 803, an image list 804, and a layout completion button 805.

The double-page spread list 802 displays a list of thumbnail images based on the layout data of the double-page spreads included in the album data. When the user licks a thumbnail image with the mouse 107, the double-page spread display area 803 displays the double-page spread image corresponding to the thumbnail selected in the double-page spread list 802.

By operating the displayed double-page spread image with the mouse 107, the user can change the layout of the images and delete the images. The region determined to be a difference region by the difference region determination unit 211 is highlighted by the difference region highlighting unit 212. FIG. 8B illustrates examples of double-page spreads highlighted in the double-page spread display area 803 by the difference region highlighting unit 212. A difference region 806 illustrates an example of highlighting display made by decorating the frame of the slot determined to be a difference region. For example, the slot is highlighted by coloring the frame of the slot in red or yellow and enclosing the slot in a thicker frame than other slot display portions. In addition, like a difference region 807, the entire slot may be applied with an effect. More specifically, a difference from the model template is indicated by applying image processing to the image, for example, by making the image of the slot semitransparent, changing the tint such as gray-out, and painting the entire slot in one color. For another example, a warning mark is displayed at a portion of the slot, like a difference region 808. In either case, when the user operates the difference region with the mouse 107, the presence of a difference from the model template may be popped up to indicate the cause of the highlighted display.

The image list 804 displays a list of thumbnail images of the candidate image data included in the candidate image group set by the album generation condition setting unit 202. By dragging a thumbnail image and dropping it on the display area 803 with the mouse 107, the user can arrange the candidate image data selected as a double-page spread image.

The layout completion button 805 is a button used to complete the editing of the album data. When the user clicks the layout completion button 805 with the mouse 107, the album data is transmitted to a printer or server connected to the image processing apparatus 100 via the data communication device 108.

<Automatic Layout Processing>

The automatic layout processing according to the present exemplary embodiment will be described with reference to FIGS. 6A to 6C. FIG. 6A is a flowchart illustrating processing for performing automatic layout of the album generation application according to the present exemplary embodiment. The flowcharts illustrated in FIGS. 6A to 6C are implemented, for example, by the CPU 101 loading a program stored in the HDD 104 or the ROM 102 into the RAM 103 and executing the program.

In step S601, the album generation condition setting unit 202 sets the album generation conditions. According to the present exemplary embodiment, the model album data and a candidate image group to be used for an album are set as the album generation conditions.

In step S602, the model album data acquisition unit 203 loads the model album data set in step S601 and loads the model album data in the RAM 103. The model album data acquisition unit 203 loads the model image data from the HDD 104 according to the image file path recorded in the model album data and loads the model image data in the RAM 103.

In step S603, the model image analysis unit 204 analyzes each piece of the model image data loaded in the RAM 103 in step S602. In this case, the image analysis in this step will be described with reference to FIG. 6B.

In step S60301, the model image analysis unit 204 acquires image capturing date/time information corresponding to each piece of the model image data acquired by the model album data acquisition unit 203. According to the present exemplary embodiment, the image capturing date/time information is acquired based on the Exif information accompanying each piece of the model image data.

In step S60302, the model image analysis unit 204 performs the object detection and the classification of the detected objects on each piece of the model image data. According to the present exemplary embodiment, the model image analysis unit 204 detects a face as an object. An arbitrary known method is applicable as a face detection method. Such known methods include AdaBoost for generating a strong classifier based on a plurality of weak classifiers. According to the present exemplary embodiment, the face of a person is detected by using the strong classifier generated through AdaBoost. The model image analysis unit 204 detects a face and at the same time acquires the upper left and the lower right coordinate values of the detected face region in an image. The position and size of the face are identified by obtaining the two kinds of coordinate values. In addition, by performing AdaBoost for detecting animals such as dogs and cats and dishes, like the faces of persons, the model image analysis unit 204 can detect objects of persons, animals, and dishes and, at the same time, classify objects in an image. Detection target objects are not limited thereto but may include flowers, buildings, and stationary articles. Also, although a case where objects are classified through AdaBoost has been described above, image recognition based on a deep neural network may also be employed.

In step S60303, the model image analysis unit 204 performs the personal recognition on the face detected in step S60302. First, the model image analysis unit 204 derives the similarity between the extracted face image and the representative face image stored for each personal identifier (ID) in a face dictionary database. Then, the model image analysis unit 204 determines the personal ID with the derived similarity being larger than or equal to a predetermined threshold value and being the highest, as the ID corresponding to the extracted face image. More specifically, the person corresponding to the personal ID with the derived similarity being larger than or equal to the predetermined threshold value and being the highest is identified as the person having the extracted face image. When all of similarities derived for each personal ID are less than the predetermined threshold value, the model image analysis unit 204 recognizes the person having the extracted face image as a new person, assigns a new personal ID to the new person, and registers the person in the face dictionary database. The face dictionary database is stored, for example, in the HDD 104.

In step S60304, the model image analysis unit 204 derives feature amounts for each piece of the model image data. The color information is an example of an image feature amount. Examples of methods for using the color information as an image feature amount include the histogram. In image data, three different values of red (R), green (G), and blue (B) are generally recorded for each pixel. In this case, a histogram is generated for each of the R, B, and G values for the entire image. A histogram can be generated by counting the frequency of appearance of a certain value in each range. For example, when a pixel value is recorded as a number from 0 to 255 counted in 16 steps (0 to 15, 16 to 31, . . . , and 240 to 255), a 48-dimensional (48=3 values×16 steps) feature amount can be acquired. However, the image feature amount is not limited thereto. For example, the feature amount may be derived by using a deep neural network. More specifically, when the model image data is input to a deep neural network that performs object recognition, intermediate values in the calculation process are obtained in addition to the recognition result including object types and numeric values indicating the probabilities of the object types. The intermediate values can be used as feature amounts representing the model image data because the image features for recognizing objects are compressed in the intermediate values.

In addition, the object detected in step S60302 and the result of the personal recognition in step S60303 may be used as feature amounts. For example, the number of persons captured in the image, and the frequency of appearance of a person in the entire image group based on the personal recognition result may be used as feature amounts. Referring back to FIG. 6A, the description will be continued.

Although, in the present exemplary embodiment, the model image analysis unit 204 analyzes the model image data, it is not limited thereto. For example, the result of the analysis performed by the model image analysis unit 204 is stored in the HDD 104. The model image analysis unit 204 may check whether the analysis result for the model image data is stored in the HDD 104 and, if the result is stored, may read the result.

In step S604, the candidate image acquisition unit 205 reads the candidate image group set in step S601 from the HDD 104 and loads the candidate image group in the RAM 103. In step S605, the candidate image analysis unit 206 analyzes the candidate image data included in the candidate image group loaded in the RAM 103 in step S604. The image analysis in this step will be described with reference to FIG. 6C. Analysis processing in steps S60501 to S60504 is basically similar to the analysis processing in steps S60301 to S60304, respectively, and the detailed description thereof will be omitted. The difference between the two pieces of analysis processing is that the target image data is the model image data or the candidate image data.

In step S60501, the candidate image analysis unit 206 acquires image capturing date/time information corresponding to each piece of the candidate image data of the candidate image group acquired by the candidate image acquisition unit 205.

In step S60502, the candidate image analysis unit 206 performs the object detection and the classification of the detected objects on each piece of the candidate image data of the candidate image group acquired by the candidate image acquisition unit 205.

In step S60503, the candidate image analysis unit 206 performs the personal recognition on the faces detected in step S60502.

In step S60504, the candidate image analysis unit 206 derives image feature amounts for each piece of the candidate image data of the candidate image group.

In step S60505, the candidate image analysis unit 206 gives an image score to each piece of the candidate image data of the candidate image group. The in-focus degree is an example of an image score. As a method for determining the in-focus degree, a method for edge detection can be used. As a method for edge detection, the known Sobel filter can be used. This method detects an edge of an image by using a Sobel filter and calculates the brightness gradient, i.e., the inclination of the edge by dividing the luminance difference between the starting and the ending points of the edge by the distance between the two points. As a result of calculating the average edge inclination in the image, an image having a larger average inclination can be assumed to be more in-focus than an image having a smaller average inclination. The method according to the present exemplary embodiment sets a plurality of threshold values for measuring the magnitude of the calculated average edge inclination and determines whether the calculated average edge inclination is larger than or equal to any one threshold value to determine whether the calculated in-focus amount is a permissible in-focus amount. More specifically, the method sets a first and a second inclination threshold value (first inclination threshold value>second inclination threshold value) as two different inclination threshold values, and determines the in-focus degree in three different levels (○, Δ, and X). If the average edge inclination in the image is larger than or equal to the first threshold value, it is a preferred in-focus degree (represented by ○). If the average edge inclination of the image is less than the first threshold value and is larger than or equal to the second threshold value, it is a permissible in-focus degree (represented by Δ). If the average edge inclination of the image is less than the second threshold value (represented by X), it is an impermissible in-focus degree. In this way, a high score can be given to an in-focus image. Although, in the present exemplary embodiment, the in-focus degree is used as a score for representing the image quality, it is not limited thereto. Examples of applicable scores may include the image size, image capturing information such as lens information used at the time of image capturing, and the compression format of the image input to the application.

A score may be given depending not only on the image quality but also on the contents included in the image. For example, the face sizes derived in step S60502 and the personal recognition result obtained in step S60503 can be used. First, as a result of the personal recognition in the candidate image data, the candidate image analysis unit 206 sets the person appearing the largest number of times as the main subject. When the main subject is not included in the candidate image data, 0 point is given as a score for each main subject in the candidate image data. On the other hand, when the main subject is included in the candidate image data, the ratio of the face size of the person set as the main subject to the image size is given as a score for each main subject in the candidate image data. Although, in the present exemplary embodiment, scoring is performed for each main subject by using the face sizes, objects other than the face sizes may also be used. For example, when a smile is detected as a result of determining the facial expression of a person as the main subject, points may be added. When an object other than a person is set as the main subject, scoring may be similarly performed depending on the object size by using the results of the object detection and classification in step S60303. As described above, the candidate image analysis unit 206 gives a score to each piece of the candidate image data of the candidate image group based on the in-focus degree in the analysis candidate image data and whether the main subject is included in the image. Referring back to FIG. 6A, the description will be continued.

In step S606, the layout generation unit 208 selects the spread number of the layout generation target. According to the present exemplary embodiment, the layout generation unit 208 selects the spread number from the first spread.

In step S607, the similar image selection unit 207 selects the candidate image data to be arranged as similar images in the page of the spread number selected in step S606, based on the model image analysis result obtained by the model image analysis unit 204 and the candidate image analysis result obtained by the candidate image analysis unit 206. According to the present exemplary embodiment, first, the similar image selection unit 207 acquires the model image feature amount related to the model image data arranged in the page of the spread number selected in step S606, from the model image analysis result obtained by the model image analysis unit 204. Subsequently, the similar image selection unit 207 calculates the similarity of the image feature amount of each piece of the candidate image data to each of the acquired model image feature amounts. The similarity can be calculated by using, for example, the Euclidean distance between the two feature amounts. The candidate image data having the highest similarity is selected as a similar image. Further, the candidate image data once selected is excluded from the subsequent similarity calculation to prevent the same candidate image data from being selected again. Although, in the present exemplary embodiment, similar images are selected by using image feature amounts, it is not limited thereto. For example, the image score analyzed by the candidate image analysis unit 206 may be used. More specifically, five pieces of the candidate image data having five highest feature amounts similar to the feature amount of the model image data are selected. Of these pieces of data, the piece of the candidate image data having the highest score may be selected as a similar image. Further, for another example, the personal recognition results by the model image analysis unit 204 and the candidate image analysis unit 206 may also be used. For example, when the main subject is included in the model image data, the candidate image data not including the main subject is prevented from being selected as similar image data even if the candidate image data has a high similarity in image feature. The above-described processing acquires the similarity between the model image arranged on the n-th page (n is a natural number) as a layout result for the model album data and the similar image arranged on the n-th page as a layout result for the similar album data.

In step S608, the layout generation unit 208 assigns the similar image data selected in step S607 to the model template. The layout generation method according to the present exemplary embodiment will be described with reference to FIG. 7A. FIG. 7A illustrates an example of the spread model template selected in step S607 and an example of the layout data generated by the layout generation unit 208. First, the layout generation unit 208 acquires the model template 701. The model template 701 is a template used for the page of the spread number selected in step S606 out of the model templates acquired by the model album data acquisition unit 203. The model template 701 records the model image data and arrangement information thereof. The model image data 702 and the model image data 703 represent the contents and arrangements of model images. The candidate image group 704 represents the image group acquired by the candidate image acquisition unit 205. The similar image data 705 and the similar image data 706 represent the similar image data selected in step S607. The similar image data 705 is similar to the model image data 702, and the similar image data 706 is similar to the model image data 703. The layout generation unit 208 arranges the similar image data 705 instead of the model image 702 and arranges the similar image data 706 instead of the model image 703 to generate the layout data 707. This enables generating layout data similar to the model template.

In step S609, the difference region determination unit 211 determines a region having a difference from the model template acquired by the model album data acquisition unit 203 in the layout data generated by the layout generation unit 208. A determination method has been described above in the description of the difference region determination unit 211 illustrated in FIG. 2, and the detailed description thereof will be omitted. FIG. 7B illustrates layout data when there is no similar image data similar to the model image data 702 in the model template 701. In this case, in step S609, the difference region determination unit 211 determines a dotted line region 708 in the layout data 707 as a region having a difference.

In step S610, the layout generation unit 208 determines whether the processing in steps S606 and S607 is completed for all of the double-page spreads in the model album data acquired by the model album data acquisition unit 203. When the processing is completed for all of the double-page spreads (YES in step S610), the processing proceeds to step S611. On the other hand, when the processing is not completed for all of the double-page spreads (NO in step S610), the processing returns to step S606.

In step S611, the album data output unit 209 collectively outputs (or controls display of) the layout data including all of the double-page spreads generated by the layout generation unit 208 and commercial material information set by the album generation condition setting unit 202, as album data. The album data has, for example, the format illustrated in FIG. 3A and is stored in the HDD 104.

The stored album data is displayed as a layout result as illustrated in FIG. 8A. When the album data is displayed as a layout result, the determination result in step S609 is reflected. More specifically, when the double-page spread image displayed in the double-page spread display area 803 illustrated in FIG. 8A includes the difference region determined to have a difference in step S609, the difference region is displayed in a more highlighted manner than other regions, as illustrated in FIG. 8B. Based on the layout result for the model album data and the layout result for the similar album data, the above-described processing displays a region having a difference satisfying a predetermined condition in the layout result for the similar album data, in a more highlighted manner than other regions.

According to the present exemplary embodiment, a region having a low similarity between the model image data and the laid out similar image data is highlighted in the similar album data generated based on the model template. This makes it easier for the user to check slots having a difference from the model template. As a result, the user can easily output a desired album.

Figure 9:
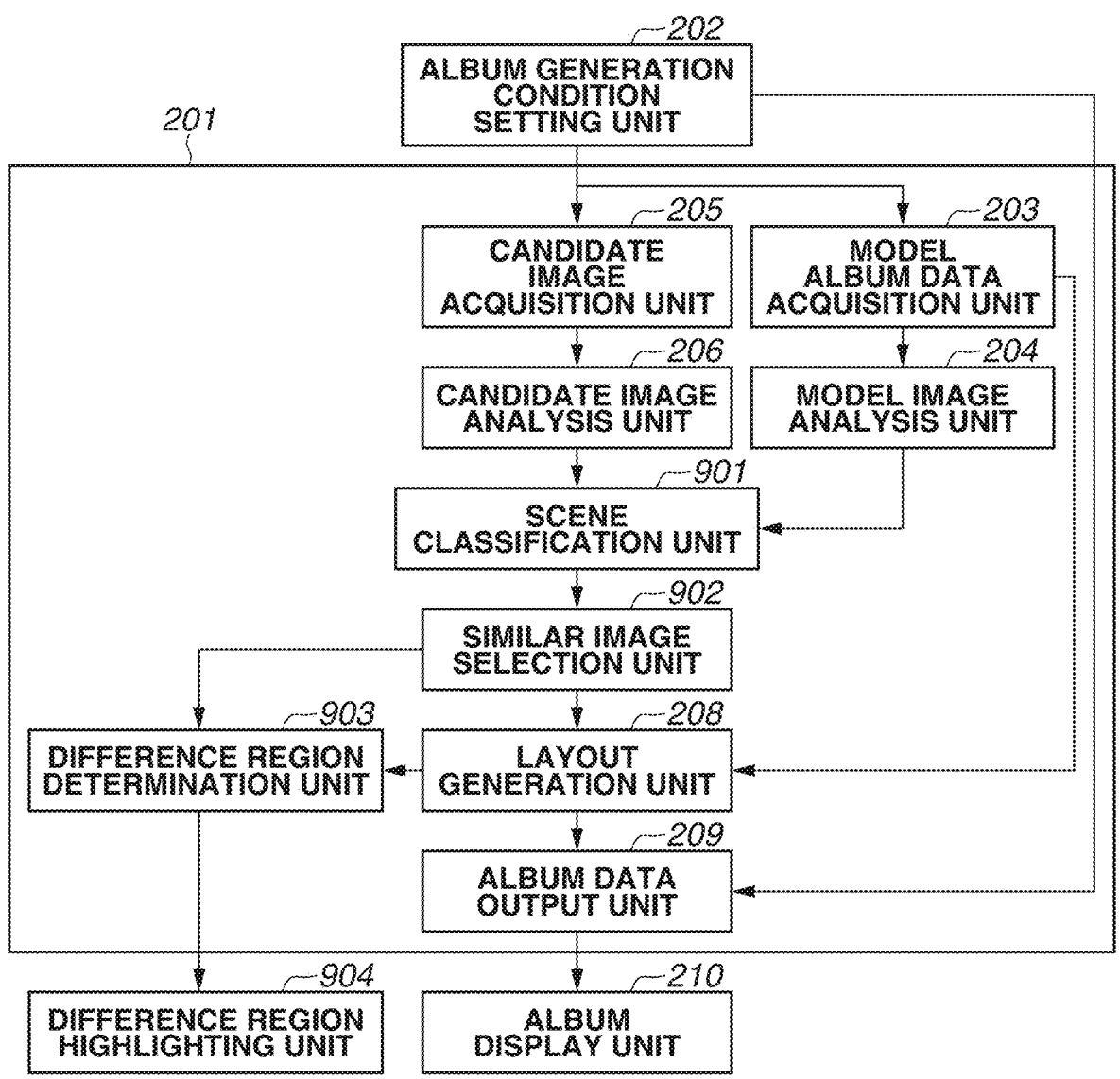
FIG. 9 is a block diagram illustrating another software configuration of the image processing apparatus.

A second exemplary embodiment will be described centering on highlighting display made when there is a difference in the entire double-page spread, not in slot units, with reference to FIGS. 9 and 10. FIG. 9 is a block diagram illustrating a configuration of the album generation according to the present exemplary embodiment. Reference numerals identical to those in the first exemplary embodiment represent the same processing by the same apparatus, and the redundant description thereof will be omitted.

A scene classification unit 901 classifies the candidate image group into a plurality of sub image groups by using the analysis information derived by the candidate image analysis unit 206, and determines a scene category for each sub image group. Examples of scene categories include situations, such as indoor and outdoor scenes, and events when image capturing is performed, such as travels and wedding ceremonies.

More specifically, by using the image capturing date/time information the acquired by the candidate image analysis unit 206, the scene classification unit 901 first divides the candidate image group into a plurality of sub image groups based on the difference in the image capturing date/time between pieces of the candidate image data included in the candidate image group. An example of an actual division will be as described below.

First, the scene classification unit 901 identifies the candidate image data with the oldest image capturing date/time as an image of interest from the candidate image group. The scene classification unit 901 calculates the difference in the image capturing date/time between the image of interest and the candidate image data with the second oldest image capturing date/time (the second oldest image in this stage)

and determines whether the calculated difference in the image capturing date/time is larger than or equal to a predetermined threshold value. The scene classification unit 901 performs such processing on all of the candidate image data while sequentially replacing the image of interest with the candidate image data with newer image capturing date/time. According to the present exemplary embodiment, "division" means dividing the candidate image group into a plurality of sub image groups between two different images, i.e., an image with newer image capturing date/time and an image with older image capturing date/time. According to the present exemplary embodiment, when the difference between the image capturing date/time of the image of interest and the image capturing date/time of the candidate image data next older than the image of interest is 16 hours or longer, the scene classification unit 901 divides the image group between the newer candidate image data and the older candidate image data, and makes the newer candidate image data and the older candidate image data belong to a different sub image group.

Subsequently, the scene classification unit 901 determines a scene category for each sub image group. Although, in the present exemplary embodiment, scenes of sub image groups are classified into three different categories (travel, daily life, and ceremony), the classification is not limited thereto.

A table generation method illustrated in FIG. 11 will be described. First, the scene classification unit 901 acquires sub image groups that have been classified into the three categories: travel, daily life, and ceremony. In this case, for example, the scene classification unit 901 acquires a plurality of sub image groups that have been classified into travel, a plurality of sub image groups that have been classified into daily life, and a plurality of sub image groups that have been classified into ceremony. Then, the scene classification unit 901 acquires image feature amount for each of the acquired plurality of sub image groups. According to the present exemplary embodiment, examples of feature amounts to be acquired include the image capturing period, the number of captured images, and the number of image-captured persons. The image capturing period refers to the time difference between the first and the last image capturing of a sub image group. The number of image-captured images refers to the number of pieces of image data (number of photographs) included in a sub image group. The number of image-captured persons refers to the number of faces included in each piece of image data included in a sub image group, i.e., the number of faces included in one piece of image data. Then, the scene classification unit 901 acquires the average and standard deviation of the image capturing periods for each scene, the average and standard deviation of the numbers of image-captured images, and the average and standard deviation of the numbers of image-captured persons for each image, based on the image feature amounts for the plurality of sub image groups for each scene. In the present exemplary embodiment, assume that the number of faces for each piece of image data is equal to the number of persons for each piece of image data. FIG. 11 illustrates examples of averages and standard deviations of the image capturing periods (hours), the numbers of captured images, and the numbers of image-captured persons. These acquired values are prestored in the program of the album generation application. More specifically, the parameters illustrated in FIG. 11 are generated through the learning in a design stage by using collected images, and prestored in the program.

Subsequently, the scene classification unit 901 calculates the averages of the image capturing periods, the numbers of captured images, and the numbers of image-captured persons for each of the plurality of sub image groups generated by dividing the candidate image group. Then, by using Formulas (2) and (3), the scene classification unit 901 gives scores based on the averages of the image capturing periods, the numbers of captured images, and the numbers of image-captured persons, and the average and standard deviation for each scene illustrated in FIG. 11.

Score for each scene and feature amount=50−|10×
(Average for each scene and feature amount−
Feature amount for each sub image group)/
Standard deviation for each scene and feature
amount)     (2)

Average score for each scene=(Score of image capturing period for each scene+Score of the number of captured images for each scene+Score of the number of image-captured persons for each scene)/Number of feature amount items     (3)

Using Formulas (2) and (3), scores of the sub image group of interest in the candidate image group can be obtained for each scene and each feature amount. For example, scores of the image capturing period, the number of captured images, and the number of image-captured persons for travel scenes of the sub image group of interest. When these scores are averaged by using Formula (2), scores for travel scenes of the sub image group of interest are calculated. Likewise, scores for other scenes (daily life and ceremony scenes) are also obtained. In this way, the average score of the sub image group of interest is calculated for each of travel, daily life, and ceremony scenes.

Then, the scene classification unit 901 classifies the scene with the highest point in the sub image group of interest into a scene of the sub image group of interest. When two or more scenes have the same score, the scene classification unit 901 classifies the scenes based on a scene priority. For example, according to the present exemplary embodiment, the priority order for the sub image group of interest is predetermined in this order: daily life (highest), ceremony, and travel. However, the priority order is not limited thereto but may be set by the user. The scene classification unit 901 identifies other sub image groups in the candidate image group as the sub image group of interest, and performs similar processing for determining scene categories.

According to the present exemplary embodiment, the above-described processing assigns daily life, ceremony, and travel scenes to the plurality of sub image groups generated from the candidate image group. The album generation application manages the sub image groups in association with a scene ID to enable scene identification.

Although, in the present exemplary embodiment, the sub image groups are generated from the candidate image group by using the image capturing date/time information, the information to be used is not limited thereto. For example, the candidate image group may be divided by using image capturing position information so that images with close image capturing positions belong to the same sub image group. For another example, personal recognition results may also be used. For example, in a classbook, if images of students belonging to a certain group (class or activity) are preregistered in the application, an image group formed of a collection of images including the students belonging to the group may be considered as one sub image group. For still another example, information other than image information may also be used. A method for collecting similar events as one scene will be described. The name of a folder storing images or tag information given by a social networking service is acquired as meta information accompanying the image data. For example, an image data group having meta information including the same search term, such as "athletic meet" and "school trip", is considered as one sub image group. To specify a search term, the user may select one of search terms prestored in the application via the album generation condition setting unit 202 or input a search term in a text box.

Although, in the present exemplary embodiment, the image capturing period, the number of captured images, and the number of image-captured persons are considered as feature amounts in the scene classification, it is not limited thereto. For example, in order to distinguish the indoor scene and outdoor scene, a flag, obtained through image segmentation using machine learning, indicating whether the sky is captured may be used as a feature amount. Alternatively, the sub image group "ceremony" may be further classified. For example, when ceremony is classified into wedding ceremony and banquet, two persons most frequently appear in the entire image data are identified as a bridal couple, by using the personal recognition result. Then, scenes including many photographs including only the bridal couple may be classified as wedding ceremony, and scenes including many photographs including persons together with the bridal couple may be classified as banquet. Further, feature amounts may be acquired through machine learning. For example, a scene to be classified and an image group representing the scene may be prepared, and the scene classification may be performed through the learning by using a Convolution Neural Network (CNN) so that an image is input to output a scene classification result.

The similar image selection unit 902 selects image data to be used for an album from the candidate image group based on analysis information about the model image analyzed by the model image analysis unit 204 and analysis information about the candidate image analyzed by the candidate image analysis unit 206. In the present exemplary embodiment, the scene ID determined by the scene classification unit 901 is used when the similar image selection unit 207 performs processing for similar image selection. More specifically, the similar image selection unit 207 performs the processing of similar image selection from the candidate image data included in the sub image group associated with the same scene ID as the model image. In this case, when there is no sub image group given the same scene ID as the model image, a flag indicating "No similar image" is attached to the target slot of the model template for management. The method of using the scene ID in the processing for similar image selection is not limited thereto. For example, the image data given a plurality of scene IDs associated with the scene ID given to the model image may be a selection target of the similar image. The determination for the flag "No similar image" may not be performed only by the scene ID. "No similar image" may be determined for a low similarity between the model image and the similar image selected based on the similarity of the candidate image.

In addition to the processing of the difference region determination unit 211, the difference region determination unit 903 also determines as a difference region an image that has been determined as "No similar image" by the similar image selection unit 902.

Figure 12A:
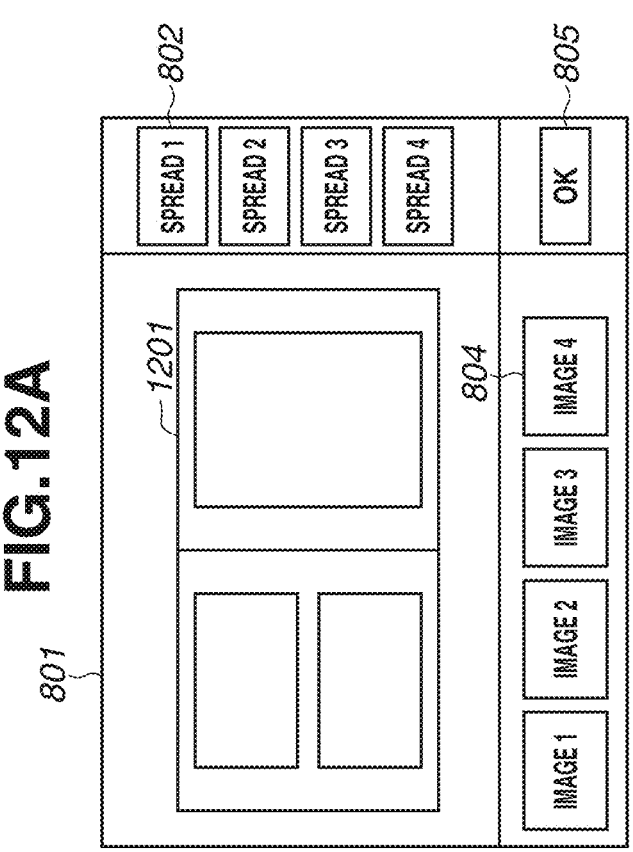
FIGS. 12A and 12B illustrate still another GUI of the album generation application.
Figure 12B:
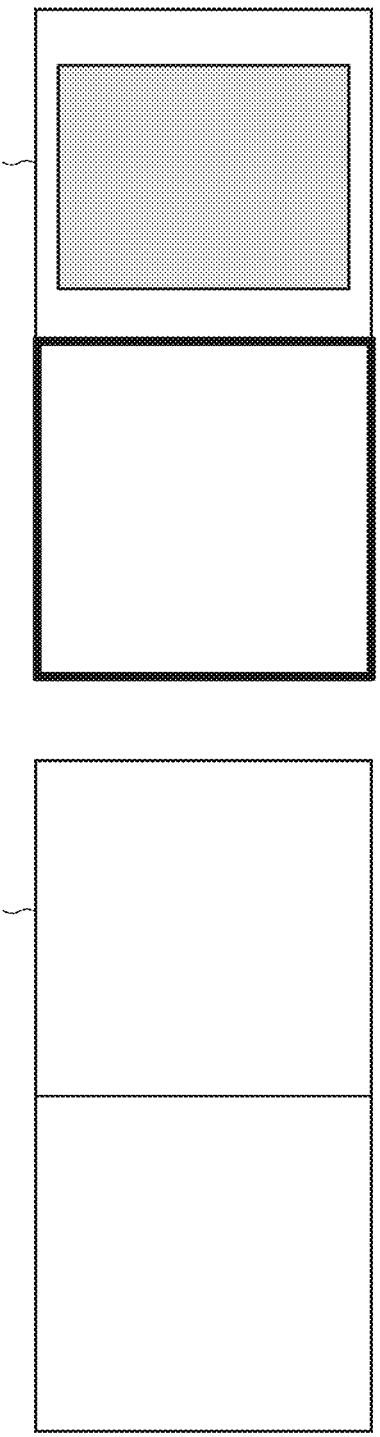

The difference region highlighting unit 904 highlights a region determined to have a difference by the difference region determination unit 903. The highlighting display for slots is similar to highlighting display by the difference region determination unit 211. Further, according to the present exemplary embodiment, the difference region determination unit 903 also highlights a difference region for the entire double-page spread. According to the present exemplary embodiment, when the difference region determination unit 903 determines a difference region for all slots of a certain double-page spread, the difference region determination unit 903 highlights the entire double-page spread. FIGS. 12A and 12B illustrate the highlighting display according to the present exemplary embodiment.

In a double-page spread 1201, only slot positions of the model template in a state where no image is assigned, is displayed. As a result, the user views the double-page spread 1201 to recognize that no image data is assigned, making it easier to recognize that the double-page spread 1201 is different from the model template. Although, referring to FIG. 12A, the highlighting display is made by displaying slots with no image assignment, the highlighting display may be made by other methods. For example, like a double-page spread 1202 illustrated in FIG. 12B, a double-page spread including no slot and no image data may be displayed. For example, when the similar image data assigned to the slot on the left-side page in the double-page spread has a low similarity, and the similar image data assigned to the slot on the right-side page therein has a high similarity, a double-page spread 1203 illustrated in FIG. 12B may be displayed. In this case, the highlighting display is not made on the right-side page but made on the left-side page by a frame that encloses the entire page. This makes it easier for the user to recognize, by viewing the double-page spread 1203, that the similar image data arranged on the left half of the spread has a low similarity.

Figure 10:
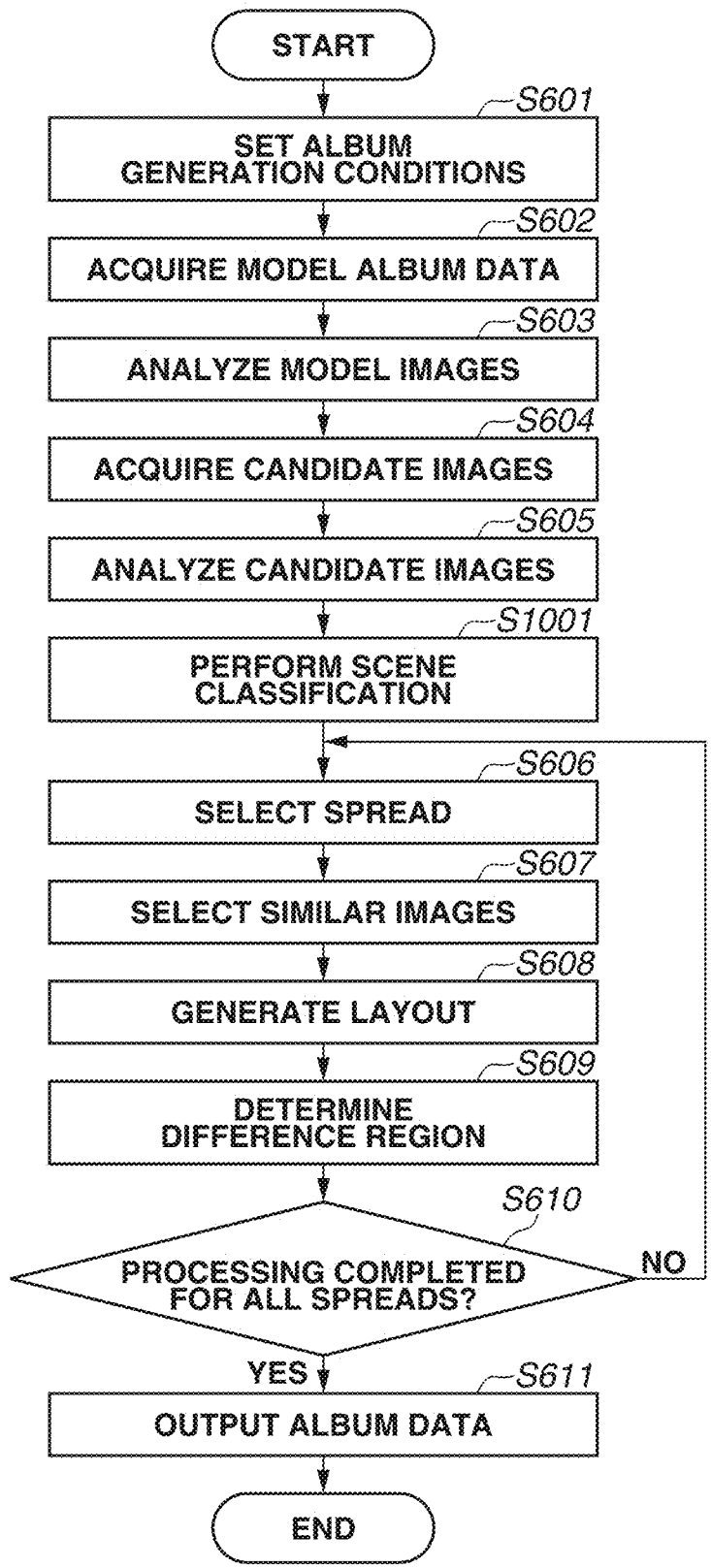
FIG. 10 is another flowchart illustrating the automatic layout processing.

FIG. 10 is a flowchart illustrating automatic layout processing according to the present exemplary embodiment. Differences from the processing illustrated in FIGS. 6A to 6C will be described.

In step S1001, the scene classification unit 901 assigns a scene by performing the above-described processing on a double-page spread of the model template, based on the analysis result analyzed by the model image analysis unit 204. The scene classification unit 901 also assigns a scene to each of the plurality of sub image groups generated from the candidate image group based on the analysis result analyzed by the candidate image analysis unit 206.

Processing in step S607 illustrated in FIG. 10 is partially different from the processing in step S607 illustrated in FIG. 6A. More specifically, the scene ID is used for similar image selection. Details of the similar image selection method is described above, and the detailed description thereof will be omitted. Processing in other steps is similar to that according to the first exemplary embodiment, and the detailed description thereof will be omitted.

According to the present exemplary embodiment, if layout processing cannot be performed for the entire double-page spread for the model template, e.g., if a scene is missing, the double-page spread can be highlighted. As a result, the user can easily output a desired album. Although, in the above-described example according to the second exemplary embodiment, processing of assigning a scene to each sub image group is described, it is not limited thereto. Even if no scene is assigned, the double-page spread may be highlighted when there is no candidate image data similar to the model image of the model template.

Other Exemplary Embodiments

Although, in the above-described exemplary embodiment, a difference region is determined based on the similarity between the model image arranged in a slot and the candidate image data arranged instead of the model image, it is not limited thereto. A difference region may be determined by regarding a double-page spread and the entire page as an image. For example, a difference region may be determined based on the similarity between the double-page spread image of the model template 701 and the double-page spread image of the layout data 707. Further, a double-page spread image may be divided into a plurality of regions, and a difference region may be determined for each region.

Although the above-described exemplary embodiment is based on an example used when generating an album, it is not limited thereto. The above-described exemplary embodiment may be used when obtaining an output result other than an album, for example, a catalog and a book.

The above-described exemplary embodiment is implemented by performing the following processing. Specifically, software (program) for implementing the functions of the above-described exemplary embodiments is supplied to a system or apparatus via a network or various types of storage media. Then, a computer (CPU, micro processing unit (MPU), or processor) of the system or apparatus reads and executes the program. The program may be executed by one computer or a plurality of computers in cooperation with each other. Not all of the above-described processing need to be implemented by software. Part or whole of the processing may be implemented by hardware such as an Application Specific Integrated Circuit (ASIC).

One CPU does not necessarily perform the entire processing, i.e., a plurality of CPUs may suitably perform processing in a cooperative manner.

The above-described processing enables the user to easily output a desired print product.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-044449, filed Mar. 13, 2020, which is hereby incorporated by reference herein in its entirety.

What is claimed is:

1. An image processing apparatus, comprising:
   at least one processor causing the image processing apparatus to act as:
   a first acquisition unit configured to analyze a model image included in model album data to acquire a first analysis result;
   a second acquisition unit configured to analyze a plurality of candidate images to acquire a second analysis result;
   a selection unit configured to select an image similar to the model image from among the plurality of candidate images, as a similar image, based on the first analysis result and the second analysis result;
   a generation unit configured to generate similar album data based on data of the selected similar image;
   a first display control unit configured to, based on a layout result for the model album data and a layout result for the similar album data different from the model album data, display a region having a difference satisfying a predetermined condition in the layout result for the similar album data, in a highlighted manner more than other regions; and
   a second display control unit configured to, based on the first analysis result and the second analysis result, as a similar image, display a layout result that includes a region where the similar image is not arranged, in a case where no image similar to the model image is selected from among the plurality of candidate images.

2. The image processing apparatus according to claim 1, wherein the at least one processor further comprising to act as:
   a third acquisition unit configured to acquire a similarity between a model image arranged as a layout result for the model album data and a similar image arranged as a layout result for the similar album data; and
   an identification unit configured to identify a region having a difference satisfying the predetermined condition, based on the similarity.

3. The image processing apparatus according to claim 2, wherein the third acquisition unit acquires a similarity between a model image arranged on the n-th page (n is a natural number) as a layout result for the model album data and a similar image arranged on the n-th page as a layout result for the similar album data.

4. The image processing apparatus according to claim 1, wherein a region having a difference satisfying the predetermined condition is a partial region of a double-page spread as a layout result for the album data.

5. The image processing apparatus according to claim 1, wherein a region having a difference satisfying the predetermined condition is the entire region of a double-page spread as a layout result for the album data.

6. The image processing apparatus according to claim 1, wherein the number of pages output as a layout result for the model album data is the same as the number of pages output as a layout result for the similar album data.

7. The image processing apparatus according to claim 1, wherein the display control unit performs, to display a region having a difference satisfying the predetermined condition in the layout result for the similar album data in a highlighted manner more than other regions, image processing different from image processing for other regions on the region having a difference satisfying the predetermined condition in the layout result for the similar album data.

8. The image processing apparatus according to claim 1, wherein the display control unit does not arrange, to display a region having a difference satisfying the predetermined condition in the layout result for the similar album data in a highlighted manner more than other regions, the similar image in the region having a difference satisfying the predetermined condition in the layout result for the similar album data.

9. A control method, comprising:
- analyzing a model image included in model album data to acquire a first analysis result;
- analyzing a plurality of candidate images to acquire a second analysis result;
- selecting an image similar to the model image from among the plurality of candidate images, as a similar image, based on the first analysis result and the second analysis result;
- generating similar album data based on data of the selected similar image;
- displaying, based on a layout result for the model album data and a layout result for the similar album data different from the model album data, a region having a difference satisfying a predetermined condition in the layout result for the similar album data, in a highlighted manner more than other regions; and
- displaying, based on the first analysis result and the second analysis result, as a similar image, a layout result that includes a region where the similar image is not arranged, in a case where no image similar to the model image is selected from among the plurality of candidate images.

10. A non-transitory computer-readable storage medium storing a program for causing a computer to execute a control method, the control method comprising:
- analyzing a model image included in model album data to acquire a first analysis result;
- analyzing a plurality of candidate images to acquire a second analysis result;
- selecting an image similar to the model image from among the plurality of candidate images, as a similar image, based on the first analysis result and the second analysis result;
- generating similar album data based on data of the selected similar image;
- displaying, based on a layout result for the model album data and a layout result for the similar album data different from the model album data, a region having a difference satisfying a predetermined condition in the layout result for the similar album data, in a highlighted manner more than other regions; and
- displaying, based on the first analysis result and the second analysis result, as a similar image, display a layout result that includes a region where the similar image is not arranged, in a case where no image similar to the model image is selected from among the plurality of candidate images.

11. The non-transitory computer-readable storage medium according to claim 10, the control method further comprising:
- acquiring a similarity between a model image arranged as a layout result for the model album data and a similar image arranged as a layout result for the similar album data; and
- identifying a region having a difference satisfying the predetermined condition, based on the similarity.

12. The non-transitory computer-readable storage medium according to claim 10, wherein a similarity between a model image arranged on the n-th page (n is a natural number) as a layout result for the model album data and a similar image arranged on the n-th page as a layout result for the similar album data, is acquired.

13. The non-transitory computer-readable storage medium according to claim 10, wherein a region having a difference satisfying the predetermined condition is a partial region of a double-page spread as a layout result for the album data.

14. The non-transitory computer-readable storage medium according to claim 10, wherein a region having a difference satisfying the predetermined condition is the entire region of a double-page spread as a layout result for the album data.

15. The non-transitory computer-readable storage medium according to claim 10, wherein the number of pages output as a layout result for the model album data is the same as the number of pages output as a layout result for the similar album data.

16. The non-transitory computer-readable storage medium according to claim 10, wherein image processing different from image processing for other regions is performed, to display a region having a difference satisfying the predetermined condition in the layout result for the similar album data in a highlighted manner more than other regions, on the region having a difference satisfying the predetermined condition in the layout result for the similar album data.

17. The non-transitory computer-readable storage medium according to claim 10, wherein the similar image is not arranged, to display a region having a difference satisfying the predetermined condition in the layout result for the similar album data in a highlighted manner more than other regions, on the region having a difference satisfying the predetermined condition in the layout result for the similar album data.

* * * * *